Aug. 2, 1932.  J. W. VAN DENBURG  1,869,987
SEPARATOR
Filed Nov. 15, 1929   2 Sheets-Sheet 1

Inventor
J. W. Van Denburg.

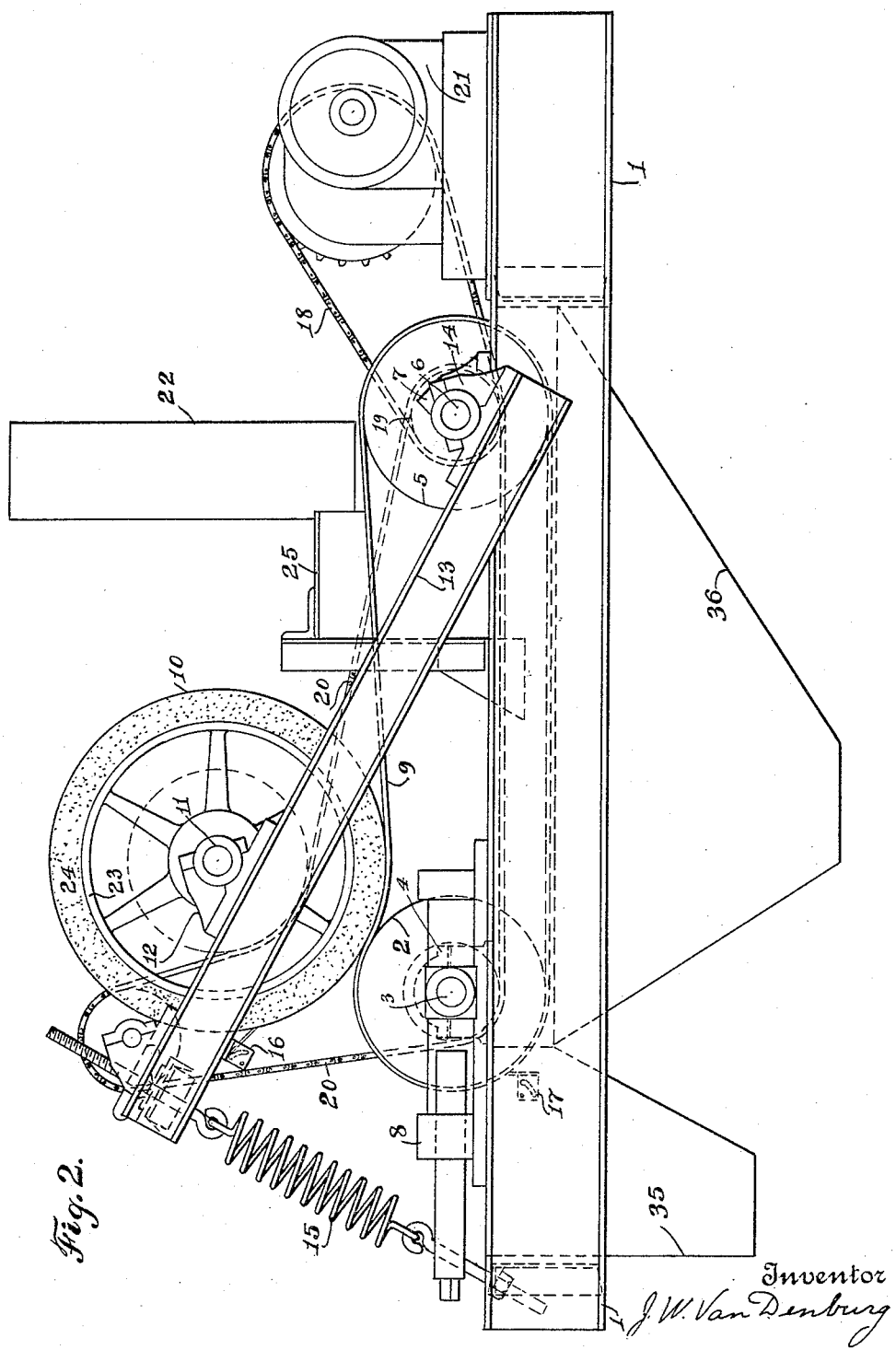

Patented Aug. 2, 1932

1,869,987

UNITED STATES PATENT OFFICE

JOHN W. VAN DENBURG, OF WHITE PLAINS, NEW YORK

SEPARATOR

Application filed November 15, 1929. Serial No. 407,421.

This invention relates to an improved form of separator, and more particularly to a method and means for extracting substantially the greater portion of water from the screenings and sludge from water borne sewage.

In the disposal of sewage the contamination of bodies of water into which the sewage is discharged is a very important factor, and this pollution is made less objectionable, as to odors, and sight, and the treatment for removal of bacteria facilitated, by the removal from the water borne sewage, of a considerable portion of the solid matter contained. This is accomplished by various methods, such as screening, settling or filtering. The material removed by these processes is commonly referred to as "screening" or "sludge". Screenings are usually automatically divided into two classes, i. e., "coarse screenings" which comprise such articles as pieces of wood, leather, rubber, dead bodies, bones, rags, metal, glass and the like and "fine screenings" which is composed largely of excretia, paper, rubber, particles of food stuffs, and other objects small enough to pass the coarse screen.

Sludge is usually referred to as the residue resulting from a settling or filtering process, and ordinarily contains a greater proportion of small particles, than screenings.

A considerable portion of the screenings and sludge are of a mixed fibrous and colloidal nature, in which the water content is of the magnitude of 80 to 95 per centum by weight.

Disposal of these screenings or sludge by incineration or burning is a very desirable and effective method, but presents many difficulties. It is evident that the organic matter in the screenings or sludge is not combustible until all of the water has been driven off, and with such a relatively low content of dry solid matter, i. e. 5 to 10 per centum, the incinerating or burning of these screenings or sludge becomes largely a water evaporating process, requiring the use of much auxiliary fuel. It is also evident that if the greater portion of the water content of the material can be economically removed before incineration is commenced, a very great saving in auxiliary fuel can be effected, as well a material reduction in the incinerator capacity required. Further this reduction in water content facilitates the handling and disposal by other means, such as burial, remote dumping or use as fertilizer.

Various methods have been devised for the purpose of separating or extracting from the screenings or sludge, the greater portion of the water content.

One method embodying the principle of centrifugal force has been tried, with indifferent success, because of the fact that considerable portions of the finer matter pass out of the centrifuge with the water, thus releasing much of the objectionable matter.

Another method embodies the principle of the screw or plunger press. Here again the same difficulty presents itself, in that when masses of the screenings or sludge are subjected to pressure as in such a press, a considerable portion of finely divided, or non-fibrous material passes out of the press with the water.

Yet another method, embodying the principle of filtration, has been tried in the form of a filter press. Here the filter bags become clogged, necessitating frequent cleaning, which is so objectionable as to render this process very undesirable. In filter beds, the success is greater, but in this method the drying is slow and great area is required, and in very large volumes of sewage, as from the larger cities, this area becomes so great as to render the method impracticable.

The object of this invention is to provide a method for the removal of substantially the greater portion of the water from the screenings, or sludge taken from sewage, which will be practicable with large as well as small volumes of sewage, and wherein the process is a continuous one.

Another object is to provide a method which will be economical of space and operating expense. Yet another object is to provide a method in which the greater portion of the water will be removed, while substantially all of the solid matter will be retained.

My invention consists essentially in placing the screening or sludge on a flat traveling surface, as a belt, and subjecting the mass in that situation to pressure by a rotating resilient roll, or rolls. This material when spread out offers small resistance to the escape of the water when subjected to pressure over a small area, the water being separated and driven backward. The resiliency of the rolls is accomplished by means of a tire or facing of rubber or similar composition, and with such a roll the bulk of the water separated will not pass under, but be driven back, running off the sides of the belt.

An embodiment of my invention is shown in the accompanying drawings, in which:

Figure 2 shows a longitudinal section of the simplest form.

Figure 1:
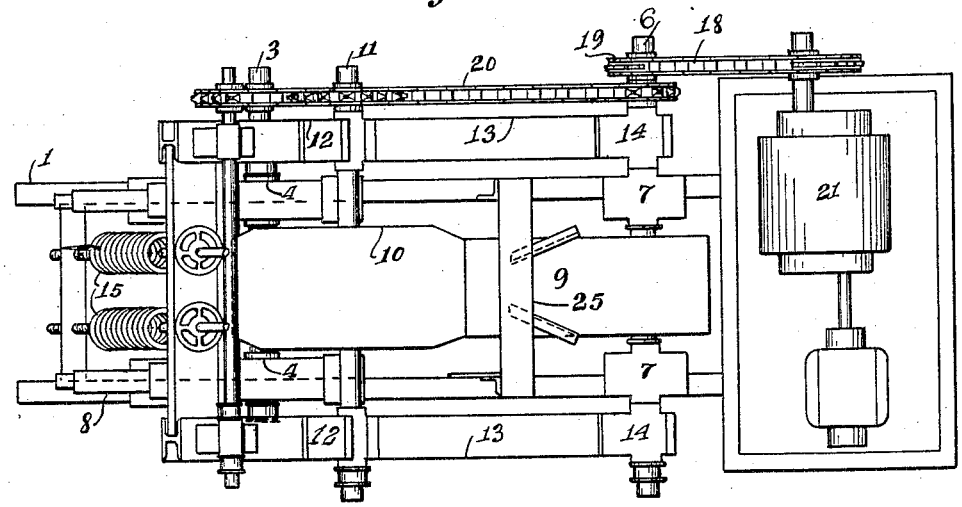
Figure 1 shows a plan of one embodiment in its simplest form.

Referring more particularly to the drawings, the mechanism is mounted on a suitable base 1.

Pulley or roll 2 is adjustably mounted on frame 1 by means of shaft 3 and bearings 4. Pulley 5 is rigidly mounted at a suitable distance from roll 2, on frame 1 by means of shaft 6 and bearings 7. Belt 9 is carried on pulley 2 and pulley or roll 5, and the slack is regulated by suitable adjustments 8.

Floating roll 10, which applies pressure and performs the function of expressing or separating the water from the material which is carried on a layer on belt 9, is pivotally mounted on shaft 6 by means of the suitable frames 13. Roll 10 is mounted directly on frame 13 by means of shaft 11 and bearings 12. This permits roll 10 to have a slight travel through an arc about shaft 6 as a center. Pulley 10 normally rests with its face in contact with belt 9, and exerting pressure on both belt 9 and pulley or roll 2. The pressure is regulated by suitable tension device 15. A suitable scraper 16 is attached to frame 13 to remove adhering material from the face of roll 10, and a suitable scraper 17 is attached to frame 1 to remove adhering material from belt 9.

The separator is driven from a suitable source of power 21, by means of a chain or belt 18, over pulley or sprocket 19, which is attached to shaft 6.

Power is transmitted to roll 10 and pulley 2 by suitable mechanism 20 such as chain and sprockets or other suitable means driven from shaft 6.

Screening or sludge is delivered to belt 9 from a suitable feed hopper or chute 22. Roll 10 may be made entirely of resilient material, mounted on shaft 11, or it may be built up of a metal or wooden spider 23, upon which the resilient tire 24 is mounted. Pulley or roll 2 is preferably constructed in the same manner although it may be an ordinary metal pulley. A suitable device 25 mounted on frame 1 serves to form the wet material into a layer of proper thickness on belt 9. Suitable guides are provided near the driving pulley to guide the belt on to the pulley.

With the mechanism in motion from the power source a layer of the wet material is deposited from chute 22, on belt 9, which carries it forward where it is subjected to a gradually increasing pressure by the contact between roll 10 and belt 9. This may be considered the initial pressure and is regulated by tension in belt 9, and the regulating device 15. This initial pressure serves to consolidate the layer of wet material while expressing some of the water before passing under the final pressure between the faces of resilient roll 10 and pulley or roll 2, which final pressure removes the remainder of the water that is separable.

The separated solid matter passes off belt 9 and out through suitable chute 35, while the water is drained off through suitable hopper 36.

The separator in this form is best adapted to the treatment of material containing considerable fibrous matter. Where the material contains a relatively small amount of fibrous matter, it is very advantageous to insert into the material artificially, additional fibrous matter, which serves to consolidate the solid matter as well as to afford a passage for the escape of the water which is expressed. This fibrous matter artificially inserted, may be in the form of an endless fibrous belt.

Figure 3:
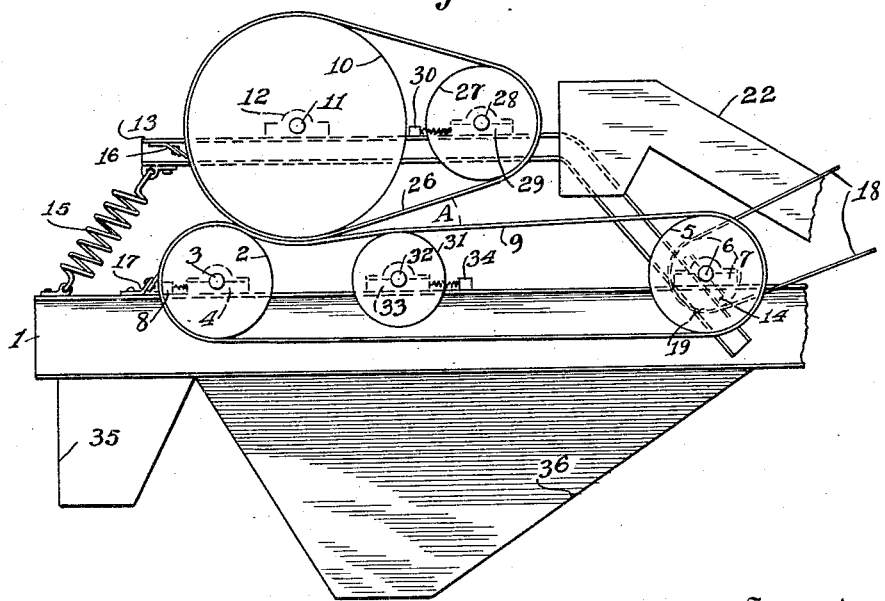
Figure 3 shows a partial longitudinal section of a modified form of the separator.

A modified form of the separator adapted for the treatment of material containing a relatively small amount of fibrous matter is shown in Figure 3, in which fibrous belt 26 passes over resilient roll 10, and idle pulley 27 which is adjustably mounted on frames 13, by means of shaft 28 and bearings 29. A suitable tension adjustment 30 is employed to maintain proper tension in fibrous belt 26. An idle pulley 31 is adjustably mounted on frame 1 by means of shaft 32 and bearings 33. A suitable adjusting device 34 serves to move idle pulley 31, thus regulating in some degree the tension in belt 9, but more particularly to regulate the bite or angle A, between belt 26 and belt 9, after belt 9 passes over pulley 31. It is at this juncture that fibrous belt 26 closes down on the layer of wet material resting on belt 9 exerting a light pre-initial pressure, by which the wet material is gathered and held in small islands preparatory to being subjected to the initial pressure between belt 9 and roll 10, under which pressure some of the water is separated, passing out through the fibrous belt, without permitting the escape of the finer material. The consolidated solid matter is thus prepared for the heavier final pressure between resilient roll 10 and roll or pulley 2, where the remainder of the water is separated, passing backward and outward through the fibers of belt 26. The solid matter passes off belt 9 into suitable hopper or chute 35.

The essential element of my method is the spreading of the wet material into a layer of suitable thickness by an initial pressure, while some of the water is removed, thus getting the mass into proper size, shape and condition, so that it will not squirt when subjected to the final pressure.

What I claim is—

1. A separator which comprises a stationary frame, a roll mounted in fixed bearings thereon, a second roll mounted on said frame parallel to the first roll, bearings for the second roll adjustable toward and away from the first roll, a belt running over the rolls, a frame pivoted on the axis of the first roll and extending toward the second roll and a resilient surfaced roll in said pivoted frame bearing against said belt at one side of said second roll and also contacting with a portion of said belt moving over said second roll.

2. A separator which comprises a stationary frame, a roll mounted in bearings thereon, a second roll mounted on said frame parallel to the first roll, bearings for the second roll adjustable toward and away from the first roll, a belt running over the rolls, a frame mounted for pivotal movement about an axis parallel to the axis of said second roll, and a resilient surfaced roll mounted parallel to said other rolls, in bearings on said pivoted frame, a continuation of the arc of movement of the axis of said resilient surfaced roll about the axis of said frame as a center intersecting said second roll, said resilient surfaced roll bearing against said belt.

Signed at New York, in the county of New York and State of New York, this 14th day of November, A. D. 1929.

J. W. VAN DENBURG.